April 17, 1928. 1,666,781
W. I. KASER
TRANSMISSION
Filed May 23, 1927 3 Sheets-Sheet 1
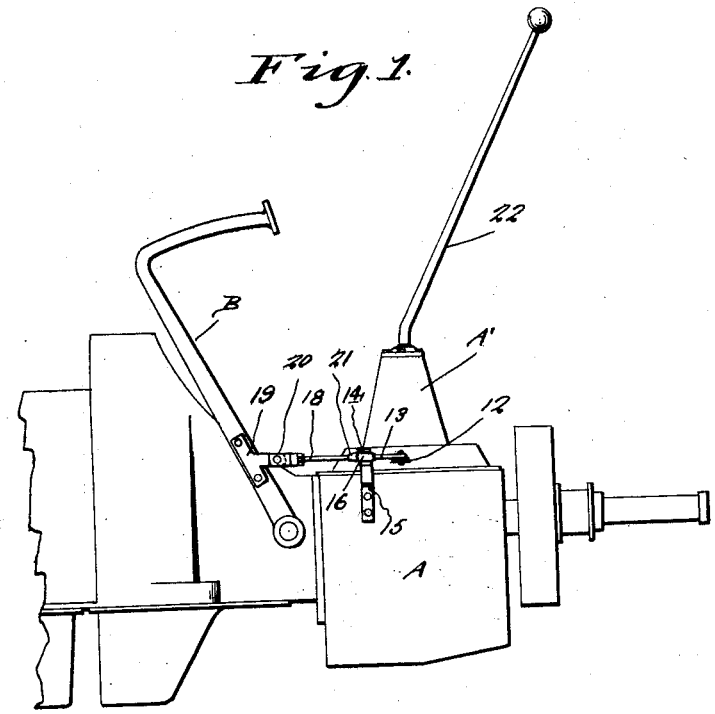
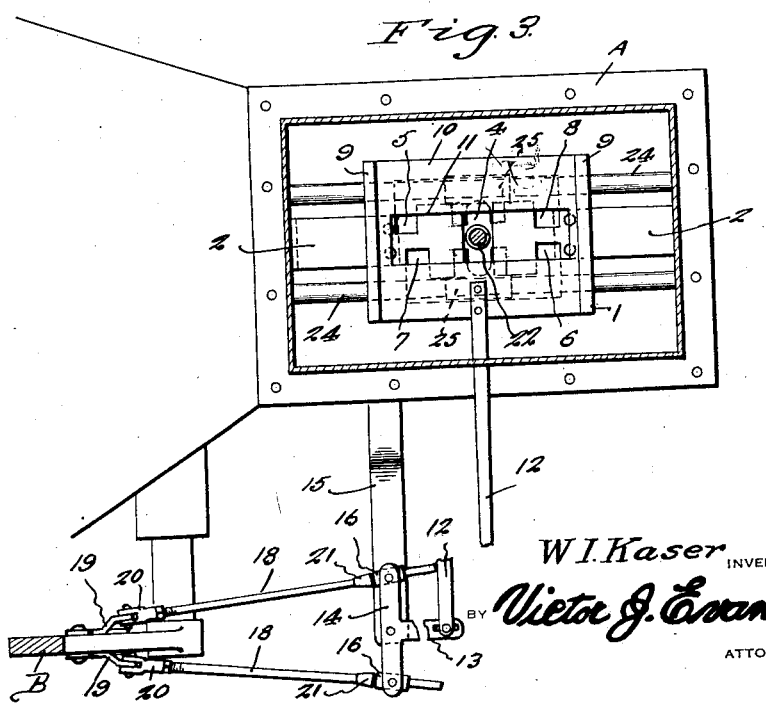
W. I. Kaser INVENTOR
BY Victor J. Evans
ATTORNEY
WITNESS: R. A. Thomas April 17, 1928. 1,666,781
W. I. KASER
TRANSMISSION
Filed May 23, 1927 3 Sheets-Sheet 2
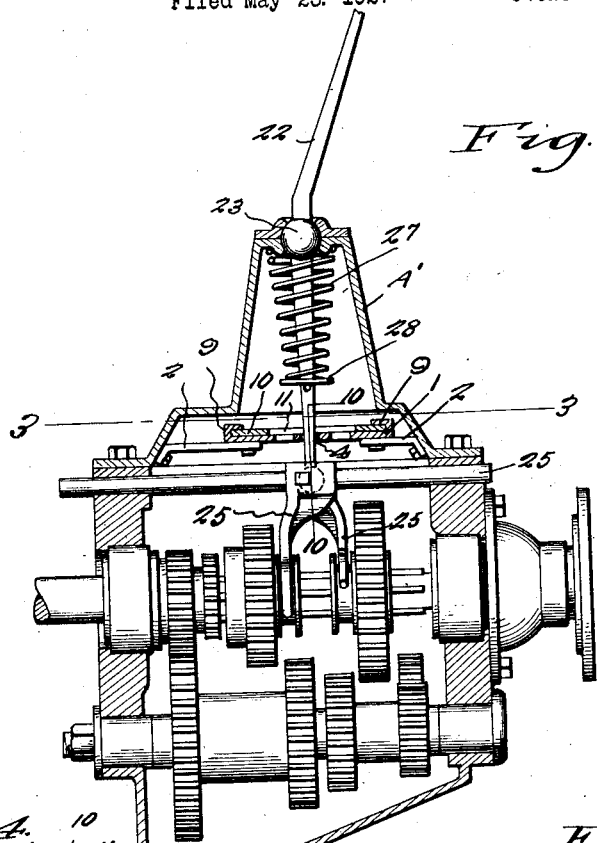
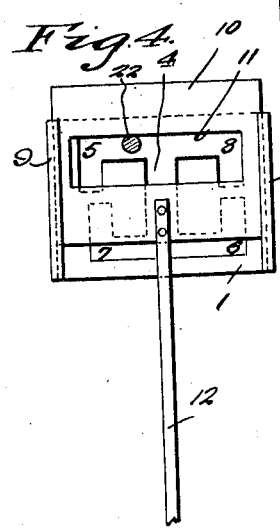
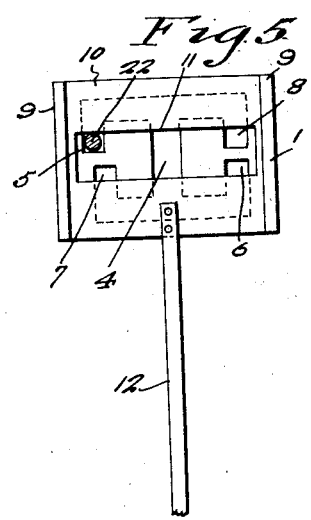
W. I. Kaser INVENTOR
BY *Victor J. Evans*
ATTORNEY
WITNESS:

April 17, 1928.  
W. I. KASER  
1,666,781  
TRANSMISSION  
Filed May 23, 1927  
3 Sheets-Sheet 3
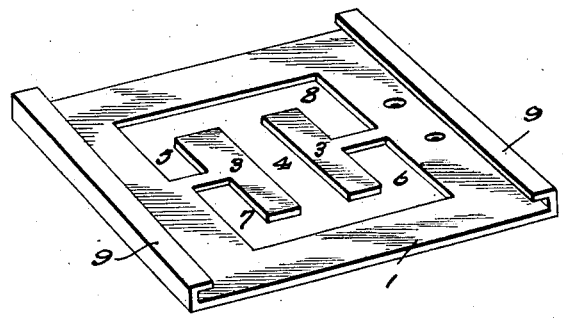
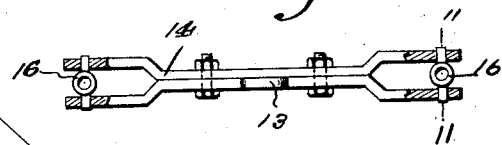
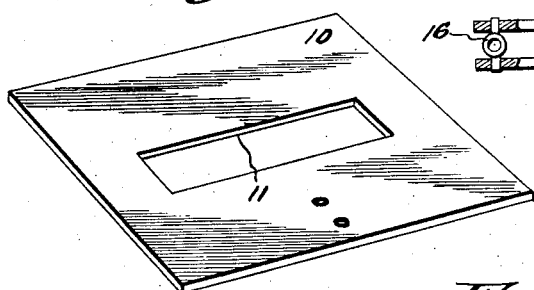
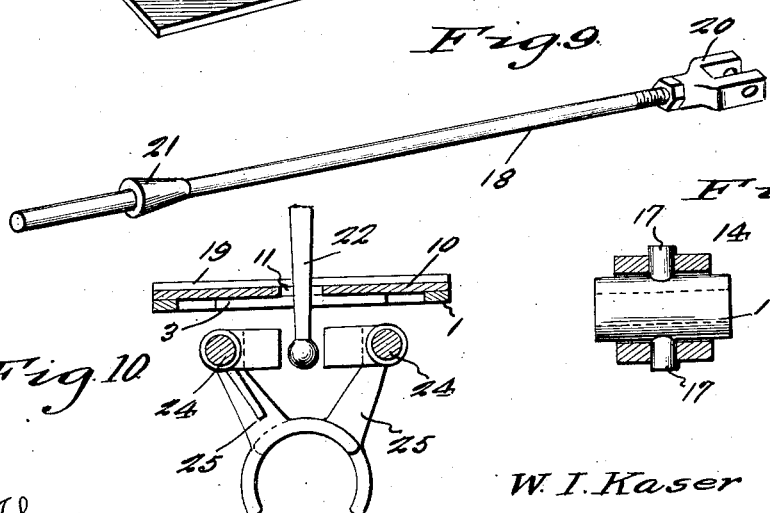
W. I. Kaser INVENTOR
BY *Victor J. Evans*
ATTORNEY.
WITNESS:

Patented Apr. 17, 1928.

1,666,781

UNITED STATES PATENT OFFICE.

WALTER I. KASER, OF BALTIC, OHIO, ASSIGNOR OF ONE-THIRD TO THOMAS G. MACPHERSON AND ONE-THIRD TO WARNER E. FARVER, OF BALTIC, OHIO.

TRANSMISSION.

Application filed May 23, 1927. Serial No. 193,582.

This invention relates to an improved gear shift for motor vehicles, the general object of the invention being to provide means whereby the clutch can be actuated from the shift lever without the operator touching the clutch pedal so that the clutch is automatically released when the gears are being shifted, which will prevent stripping of the gears.

Another object of the invention is to so form the parts of the invention that they can be applied to motor vehicles as now constructed, with but little change thereto.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a transmission means, showing my invention applied thereto.

Figure 2 is a vertical sectional view through parts of Figure 1.

Figure 3 is a section on line 3—3 of Figure 2.

Figure 4 is a plan view of the two plates, with the shifting lever moving into low speed position.

Figure 5 is a similar view showing the lever in low speed position.

Figure 6 is a perspective view of the stationary or safety plate.

Figure 7 is a view of the top or sliding plate.

Figure 8 is an edge view with parts in section, of the T-shaped lever.

Figure 9 is a view of one of the clutch pedal actuated rods.

Figure 10 is a section on line 10—10 of Figure 2.

Figure 11 is a section on line 11—11 of Figure 8.

In these views, 1 indicates a plate which is supported in the transmission case A of the vehicle by the brackets 2, this plate being formed with a central opening into which projects, from opposite sides thereof, the T-shaped extensions 3 which divide the opening into the neutral space 4, the low speed space 5, the second speed space 6, the high speed space 7 and the reverse speed space 8, it being observed that the high speed space is arranged closer to the center than are the other spaces, for the reason that the throw of the shift lever is less for high speed than for the other speeds.

The plate 1 is formed with the guideways 9 for the sliding plate 10 which is provided with an elongated opening or slot 11. A rod 12 is fastened to one side of the plate 10 and the outer end of said rod is adjustably connected to the stem 13 of a T-shaped lever 14 which is pivotally mounted on a supporting bracket 15 which is connected with the housing A. The arms of the T lever are forked and a bushing 16 is rotatably mounted in each fork by means of its trunnions 17 passing through holes in the prongs of the fork. Thus the bushing can rock about a vertical axis. A pair of bars 18 is connected to the clutch pedal B, one on each side thereof, by the brackets 19 to which the bars are pivotally connected by means of the clevises 20. An enlargement 21 is formed on each bar a distance from its rear end and the rear end of each bar passes through a bushing 16, the enlargements resting against the bushings when the parts are in neutral position, as shown in Figure 3.

The shift lever 22 is supported as usual on the top extension A' of the transmission housing by the spherical part 23 and the lower end of said lever passes through the opening 11 in plate 10 and through the opening in plate 1 and has its spherical lower end adapted to engage the recesses in the shifter bars 24 which carry the shifter forks 25, it being understood that the shifter bars, with their forks and the parts associated therewith, are of the usual construction for shifting the gears of the transmission, though the locking means for said bars are not needed with this invention. A coil spring 27 is placed on the lower portion of the shift lever and bears against the top of the extension A' and against a washer 28 carried by the lower part of the lever. This spring tends to hold the lever in upright or neutral position.

When the lever is in neutral position, it will pass through the space 4, as shown in Figure 3. When the vehicle is to be started, the shift lever is moved to the left from neutral position so that it will strike a wall of the opening 11 in plate 10 and cause said plate to move with it. This will cause the plate to move to the right, as shown in Figure 4, and the movement of this plate will cause the link 12 to rock the T lever 14 to the right and the forwardly moving arm of said T lever will push upon the inner bar 18 and cause it to depress the clutch pedal B and thus release the clutch. The bushing on the outer arm of the T lever will have sliding movement on the outer bar 18 during this operation. Thus the clutch will be released so that the gears can be moved into mesh to place the vehicle in low speed by moving the lever 22 to place its lower part in the space 5. As the lever passes into the lateral part of this space, the plate 10 will be moved to the left under the action of the clutch pedal spring and the clutch pedal will return to raised position. Then the shift to second speed is made by moving the shift lever out of the low speed space, which will again move the plate 10 to cause it to release the clutch so that the gears can be disengaged without difficulty and then the lever is moved through the space 4 into the space 6 and as it moves into said space 6, it will push the plate 10 to the left, thus depressing the clutch pedal again to release the clutch so that the gears can mesh with the clutch in disengaged condition. This will give the second speed, the clutch being engaged again as the lower part of the shift lever enters the lateral part of the space 6. Then the lever is moved out of the lateral part of the space 6, the clutch being released during this movement to permit the gears to move out of mesh without difficulty and then the lever is moved into space 7 and then into the lateral part of the same, which will place the vehicle in high speed, with the clutch engaged. To reverse, the lever is moved to place its lower part into space 8 so as to first release the clutch, then place the gears in mesh in reverse position and finally to re-engage the clutch.

Thus it will be seen that all of the shifting operations will automatically disengage the clutch without the operator placing his foot on the clutch pedal and before the gears mesh or are moved out of mesh, the clutch is released so that there is absolutely no danger of stripping the gears.

The plate 10 can be placed on the bottom of plate 1, if desired, the relative position of these plates being arranged according to the amount of throw desired on the clutch of the car on which the invention is used. It will also be seen that the invention can be applied to any three speed transmission without altering the transmission means but slightly.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the transmission and clutch means of a motor vehicle, a member arranged in the transmission housing and having an opening therein through which the lower end of the shift lever passes, means for dividing the opening into neutral, low speed, second speed, high speed and reverse speed spaces, a plate slidably connected with the first plate and having an elongated opening therein through which the lower part of the shift lever passes so that the second plate will be moved by the shift lever when the same is shifted to its various positions and means for connecting the second plate with the clutch pedal to actuate the pedal by the movement of the plate.

2. In combination with the transmission and clutch means of a motor vehicle, a member arranged in the transmission housing and having an opening therein through which the lower end of the shift lever passes, means for dividing the opening into neutral, low speed, second speed, high speed and reverse speed spaces, a plate slidably connected with the first plate and having an elongated opening therein through which the lower part of the shift lever passes so that the second plate will be moved by the shift lever when the same is shifted to its various positions, a T-shaped lever pivotally secured to a part of the vehicle, a link connecting the stem of the lever with the second plate, a pair of rods each having one end pivotally and slidably connected with each arm of the T lever and means for pivotally connecting each rod with the clutch pedal.

In testimony whereof I affix my signature.

WALTER I. KASER.